(12) United States Patent
Eguchi et al.

(10) Patent No.: US 10,950,379 B2
(45) Date of Patent: Mar. 16, 2021

(54) TRANSMISSION COIL AND POWER TRANSMISSION APPARATUS

(71) Applicant: PANASONIC CORPORATION, Osaka (JP)

(72) Inventors: Kazuhiro Eguchi, Fukuoka (JP); Ryosuke Hasaba, Kanagawa (JP); Katsuya Okamoto, Fukuoka (JP); Souichi Kawata, Fukuoka (JP); Yoshio Koyanagi, Kanagawa (JP)

(73) Assignee: PANASONIC CORPORATION, Osaka (JP)

( * ) Notice: Subject to any disclaimer, the term of this patent is extended or adjusted under 35 U.S.C. 154(b) by 0 days.

(21) Appl. No.: 16/498,964

(22) PCT Filed: Mar. 8, 2018

(86) PCT No.: PCT/JP2018/009107
§ 371 (c)(1),
(2) Date: Sep. 27, 2019

(87) PCT Pub. No.: WO2018/180355
PCT Pub. Date: Oct. 4, 2018

(65) Prior Publication Data
US 2020/0381162 A1    Dec. 3, 2020

(30) Foreign Application Priority Data
Mar. 30, 2017 (JP) .............................. JP2017-069070

(51) Int. Cl.
*H02J 50/12* (2016.01)
*H01F 38/14* (2006.01)
(Continued)

(52) U.S. Cl.
CPC .............. *H01F 27/02* (2013.01); *B60L 53/30* (2019.02); *H01F 38/14* (2013.01); *H02J 50/005* (2020.01);
(Continued)

(58) Field of Classification Search
CPC .......... H01F 27/02; H01F 38/14; B60L 53/30; B60L 2200/32; H02J 50/12; H02J 50/005; H02J 2310/42
See application file for complete search history.

(56) References Cited

U.S. PATENT DOCUMENTS

| 9,564,759 B2* | 2/2017 | Niizuma | ................ H02J 50/90 |
| 10,367,378 B2* | 7/2019 | Niizuma | ................ H02J 50/40 |

(Continued)

FOREIGN PATENT DOCUMENTS

| JP | 61-039319 | 2/1986 |
| JP | 62-288024 | 12/1987 |

(Continued)

OTHER PUBLICATIONS

International Search Report issued in International Patent Application No. PCT/JP2018/009107, dated Jun. 5, 2018, along with an English translation thereof.

(Continued)

*Primary Examiner* — Jared Fureman
*Assistant Examiner* — Michael J Warmflash
(74) *Attorney, Agent, or Firm* — Greenblum & Bernstein, P.L.C.

(57) ABSTRACT

Provided is a transmission coil which can inhibit reduction in transmission efficiency during underwater non-contact electric power transmission. A transmission coil configured to transmit electric power in water includes an annular electric wire through which an alternating current flows, and a first cover which includes non-conductive resin or non- (Continued)

magnetic resin and seals a periphery of the electric wire. The electric wire transmits the electric power via a magnetic field generated by flowing of the alternating current.

6 Claims, 12 Drawing Sheets

(51) Int. Cl.
  *H01F 27/02* (2006.01)
  *H02J 50/00* (2016.01)
  *B60L 53/30* (2019.01)

(52) U.S. Cl.
  CPC ........... *H02J 50/12* (2016.02); *B60L 2200/32* (2013.01); *H02J 2310/42* (2020.01)

(56) References Cited

U.S. PATENT DOCUMENTS

| | | | |
|---|---|---|---|
| 10,549,652 B2 * | 2/2020 | Deguchi | B60L 53/31 |
| 10,790,705 B2 * | 9/2020 | Deguchi | H02J 50/12 |
| 2005/0057422 A1 | 3/2005 | Deguchi et al. | |
| 2011/0208440 A1 * | 8/2011 | Pechstein | G01R 27/26 |
| | | | 702/30 |
| 2014/0033984 A1 * | 2/2014 | Li | A01K 63/065 |
| | | | 119/247 |
| 2014/0202730 A1 | 7/2014 | Fujito et al. | |
| 2014/0232200 A1 | 8/2014 | Maekawa | |
| 2015/0217837 A1 * | 8/2015 | Szydlowski | B63B 25/12 |
| | | | 114/74 R |
| 2015/0288226 A1 * | 10/2015 | Niizuma | H02J 7/00034 |
| | | | 307/104 |
| 2015/0333540 A1 * | 11/2015 | Niizuma | B60L 53/126 |
| | | | 114/312 |
| 2016/0013664 A1 | 1/2016 | Maekawa et al. | |
| 2016/0087456 A1 | 3/2016 | Shizuno et al. | |
| 2017/0012430 A1 * | 1/2017 | Gillett | H02J 3/383 |
| 2017/0070098 A1 * | 3/2017 | Corum | F03B 13/10 |
| 2017/0077759 A1 * | 3/2017 | Niizuma | B60L 5/005 |
| 2018/0215277 A1 * | 8/2018 | Deguchi | B60L 53/12 |
| 2018/0241259 A1 | 8/2018 | Maekawa et al. | |
| 2019/0305602 A1 * | 10/2019 | Niizuma | H01F 38/14 |
| 2019/0334380 A1 * | 10/2019 | Koyanagi | B60L 53/51 |
| 2020/0169117 A1 * | 5/2020 | Okamoto | H02J 50/005 |
| 2020/0321810 A1 * | 10/2020 | Okamoto | H02J 50/12 |

FOREIGN PATENT DOCUMENTS

| | | |
|---|---|---|
| JP | 05-325656 | 12/1993 |
| JP | 2005-102101 | 4/2005 |
| JP | 2005-217045 | 8/2005 |
| JP | 2006-158143 | 6/2006 |
| JP | 2010-177075 | 8/2010 |
| JP | 2014-136833 | 7/2014 |
| JP | 2014-183193 | 9/2014 |
| JP | 2014-222975 | 11/2014 |
| JP | 2015-015901 | 1/2015 |
| JP | 2015-80311 | 4/2015 |
| JP | 2017-028832 | 2/2017 |
| JP | 2018-170181 | 11/2018 |
| WO | 2014/185490 | 11/2014 |

OTHER PUBLICATIONS

Office Action (Decision to Grant a Patent) issued in Japan Patent Appl. No. 2017-069070, dated Jul. 2, 2019, along with an English translation thereof.

* cited by examiner

FIG.4A

|  | SPACE | FRESH WATER | SEA WATER |
|---|---|---|---|
| CONDUCTIVITY (S/m) | — | 0.01224 | 5.16 |
| SALT WATER CONCENTRATION (%) | — | — | 3.4 |
| TEMPERATURE (°C) | 24.5 | 25.7 | 24.8 |

FIG.4B

FREQUENCY 40 kHz (WITHOUT COVER)

|  | SPACE | FRESH WATER | SEA WATER |
|---|---|---|---|
| INDUCTANCE ($\mu$H) | 135 | 145 | 145 |
| Q | 361 | 282 | 195 |

FIG.4C

FREQUENCY 40 kHz (WITH COVER)

|  | SPACE | FRESH WATER | SEA WATER |
|---|---|---|---|
| INDUCTANCE ($\mu$H) | 135 | 135 | 134 |
| Q | 371 | 381 | 301 |

FIG.4D

FREQUENCY 80 kHz (WITHOUT COVER)

|  | SPACE | FRESH WATER | SEA WATER |
|---|---|---|---|
| INDUCTANCE ($\mu$H) | 136 | 147 | 148 |
| Q | 663 | 177 | 164 |

FIG.4E

FREQUENCY 80 kHz (WITH COVER)

|  | SPACE | FRESH WATER | SEA WATER |
|---|---|---|---|
| INDUCTANCE ($\mu$H) | 135 | 135 | 135 |
| Q | 670 | 679 | 341 |

FIG.5B
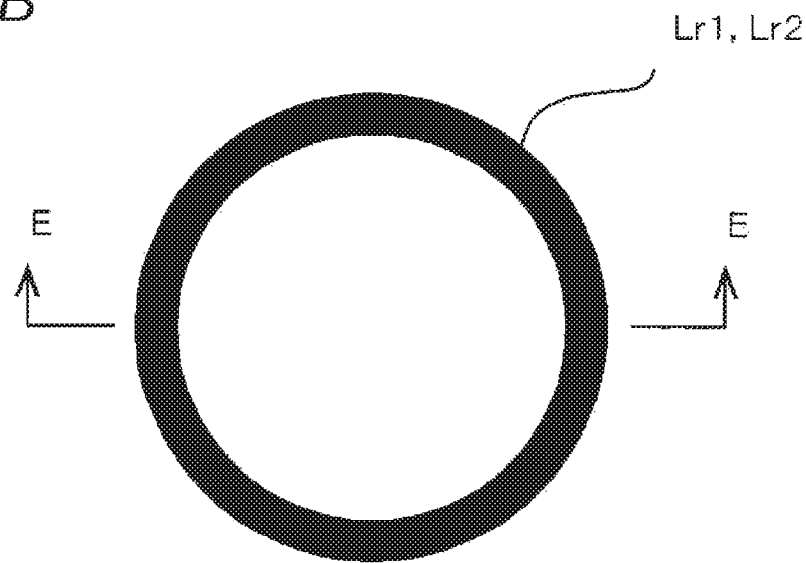
FIG.5C
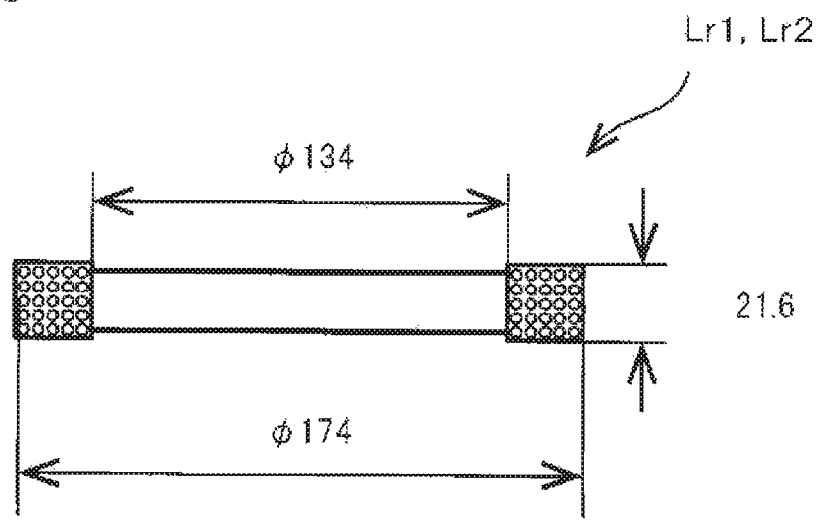
FIG.6A
| | SPACE | FRESH WATER | SEA WATER |
|---|---|---|---|
| CONDUCTIVITY (S/m) | — | 0.01224 | 5.16 |
| SALT WATER CONCENTRATION (%) | — | — | 3.4 |
| TEMPERATURE (°C) | 24.5 | 25.7 | 24.8 |

*FIG.6B*

FREQUENCY 40 kHz

|  | SPACE | FRESH WATER | SEA WATER |
|---|---|---|---|
| TRANSMISSION FREQUENCY WITHOUT COVER | 94.4% | 90.6% | 88.7% |
| TRANSMISSION FREQUENCY WITH COVER | 94.8% | 95.1% | 94.0% |

*FIG.6C*

FREQUENCY 80 kHz

|  | SPACE | FRESH WATER | SEA WATER |
|---|---|---|---|
| TRANSMISSION FREQUENCY WITHOUT COVER | 96.0% | 89.0% | 84.3% |
| TRANSMISSION FREQUENCY WITH COVER | 96.1% | 96.8% | 93.3% |

TRANSMISSION COIL AND POWER TRANSMISSION APPARATUS

TECHNICAL FIELD

The present disclosure relates to a transmission coil and an electric power transmission apparatus configured to transmit electric power in water.

BACKGROUND ART

In related art, it is known that an underwater base station, serving as an electric power transmission apparatus, transmits electric power to an underwater vehicle, serving as an electric power reception apparatus, in a non-contact manner using a magnetic resonance method (see, for example, Patent Literature 1). The electric power transmission apparatus includes an electric power transmission resonance coil, a balloon, and a balloon control mechanism. The electric power transmission resonance coil transmits electric power to an electric power reception resonance coil of the electric power reception apparatus in the non-contact manner by the magnetic field resonance method. The balloon contains the electric power transmission resonance coil therein. The balloon control mechanism expands the balloon during electric power transmission, thereby discharging water between the electric power transmission resonance coil and the electric power reception resonance coil.

An antenna apparatus is known, which transmits electric power and data to an IC-mounted medium by using an electromagnetic induction method using a 13.56 MHz frequency band (see, for example, Patent Literature 2). It is disclosed that the antenna apparatus includes at least one electric-power-supplied loop antenna, which is supplied with a signal current, and at least one non-electric-power-supplied loop antenna, which is not supplied with the signal current, a signal current is also generated in the non-electric-power-supplied loop antenna through using a magnetic field generated by the electric-power-supplied loop antenna, thereby enlarging a communication range of the electric-power-supplied loop antenna.

CITATION LIST

Patent Literature

Patent Literature 1: JP-A-2015-015901
Patent Literature 2: JP-A-2005-102101

SUMMARY OF INVENTION

Technical Problem

A Q factor (quality factor) of a coil used for electric power transmission is one index that indicates transmission efficiency of electric power transmission of the magnetic field resonance method. A plurality of transmission coils, including at least an electric power transmission resonance coil and an electric power reception resonance coil, are used in the electric power transmission of the magnetic field resonance method.

In a case where the transmission coil is immersed in water (for example, fresh water or sea water), the water may enter between coil wires (between windings). For example, fresh water or sea water has a high relative permittivity of 70 and has properties of serving as a dielectric. Therefore, when the water enters between the coil wires, dielectric loss is likely to occur. The fresh water also has a relatively large electrical conductivity, for example, 0.02 (S/m) in a case of tap water. Further, in a case of sea water, the electrical conductivity is 3.5 (S/m), which is extremely large. Therefore, electric loss may occur between windings of a coil CL due to an eddy current caused by water, and the electric loss due to the eddy current increases particularly when the coil CL is disposed in sea water. Therefore, the Q factor of the transmission coil can be reduced, and the transmission efficiency of the electric power can be reduced during non-contact electric power transmission (wireless power supply).

The present disclosure is made in view of the above circumstances, and provides a transmission coil and an electric power transmission apparatus which can inhibit the reduction in the transmission efficiency during underwater non-contact electric power transmission.

Solution to Problem

A transmission coil of the present disclosure is configured to transmit electric power in water, and includes: an annular electric wire through which an alternating current flows; and a first cover which includes non-conductive resin or non-magnetic resin and seals a periphery of the electric wire. The electric wire transmits the electric power via a magnetic field generated by flowing of the alternating current.

Advantageous Effects of Invention

According to the present disclosure, the reduction in the transmission efficiency during the underwater non-contact electric power transmission can be inhibited.

BRIEF DESCRIPTION OF DRAWINGS

FIG. 4A is a table showing measurement conditions of inductance (L) and Q factor.

FIG. 4B is a table showing measurement results of the inductance (L) and the Q factor of a coil without a cover member at a frequency of 40 kHz.

FIG. 4C is a table showing measurement results of the inductance (L) and the Q factor of a coil that includes the cover member at the frequency of 40 kHz.

FIG. 4D is a table showing measurement results of the inductance (L) and the Q factor of the coil without the cover member at a frequency of 80 kHz.

FIG. 4E is a table showing measurement results of the inductance (L) and the Q factor of the coil that includes the cover member at the frequency of 80 kHz.

FIG. 5B is a plan view showing shapes of an electric power transmission coil and an electric power reception coil.

FIG. 5C is a cross-sectional view showing the shapes of the electric power transmission coil and the electric power reception coil as viewed from a direction of arrow E-E in FIG. 5B.

FIG. 6A is a table showing transmission efficiency measurement conditions.

FIG. 6B is a table showing measurement results of the electric power transmission efficiency at the frequency of 40 kHz in the case where the cover member is provided and in the case where the cover member is not provided.

FIG. 6C is a table showing measurement results of the electric power transmission efficiency at the frequency of 80 kHz in the case where the cover member is provided and in the case where the cover member is not provided.

DESCRIPTION OF EMBODIMENTS

Hereinafter, embodiments will be described in detail with reference to the drawings. Unnecessarily detailed descriptions may be omitted. For example, a detailed description of a well-known matter or a repeated description of substantially the same configuration may be omitted. This means to avoid unnecessary redundancy in the following description and to facilitate understanding of those skilled in the art. The accompanying drawings and the following description are provided for those skilled in the art to facilitate thorough understanding of the present disclosure, and are not intended to limit the claimed subject matters.

First Embodiment

Configurations and the Like

Figure 1:
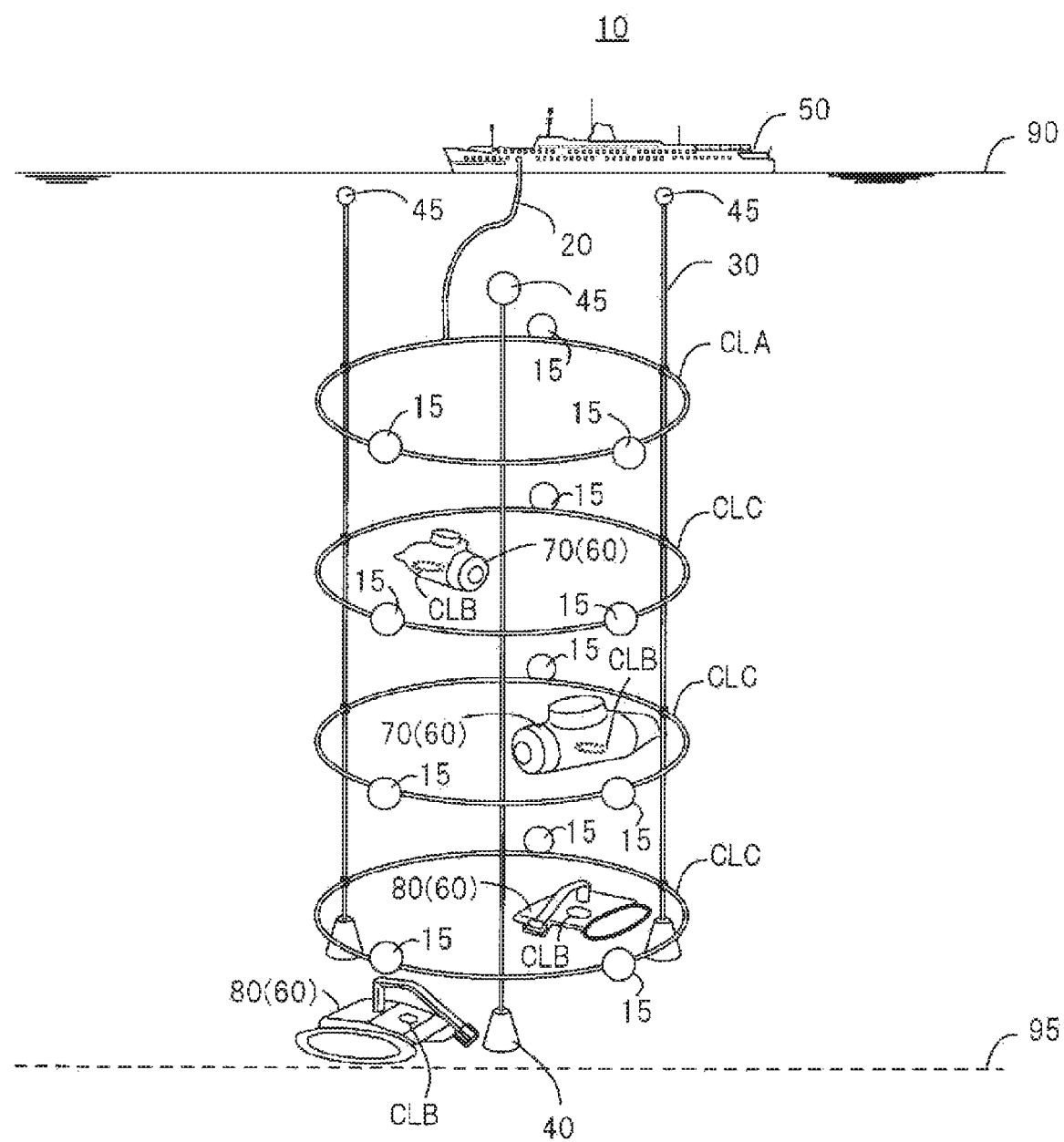
FIG. 1 is a schematic diagram showing an example of an environment in which an electric power transmission system according to a first embodiment is placed.
Figure 2:
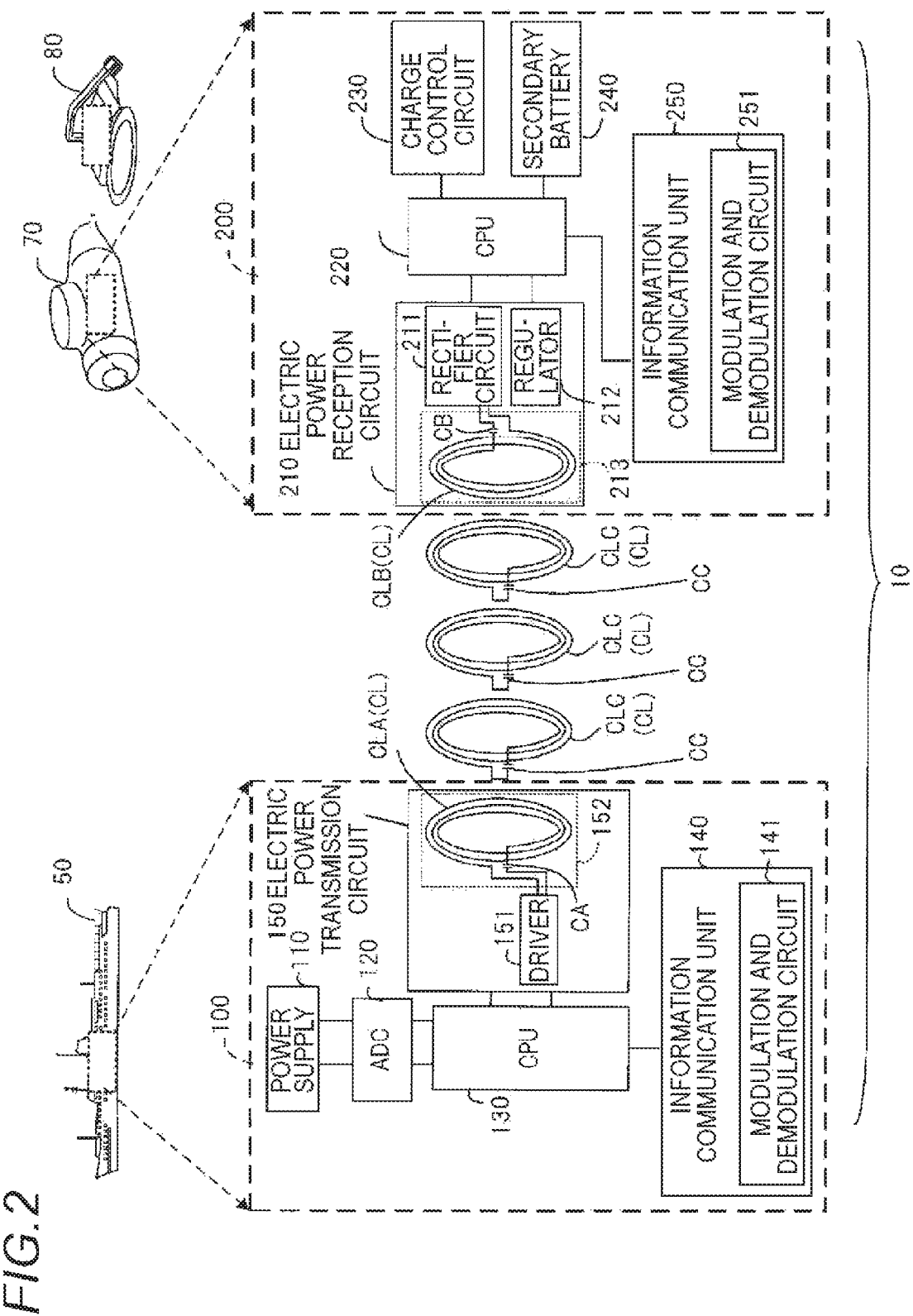
FIG. 2 is a block diagram showing a configuration example of the electric power transmission system.

FIG. 1 is a schematic diagram showing an example of an environment in which an electric power transmission system 10 according to a first embodiment is placed. FIG. 2 is a block diagram showing a configuration example of the electric power transmission system. The electric power transmission system 10 includes an electric power transmission apparatus 100, an electric power reception apparatus 200, and a coil CL. The electric power transmission apparatus 100 wirelessly (no contact point) transmits electric power to the electric power reception apparatus 200 via a plurality of coils CL in accordance with a magnetic resonance method. The number of the disposed coils CL is n and can be set to any number.

The coil CL is formed in an annular shape, for example, and is insulated by a resin cover. The coil CL is, for example, a helical coil or a spiral coil. The helical coil is an annular coil wound in the same plane. The spiral coil is an annular coil which is wound not in the same plane but in a spiral shape along a transmission direction of electric power in the magnetic resonance method. The coil CL is formed of, for example, a cab tire cable. The coil CL includes an electric power transmission coil CLA and an electric power reception coil CLB. The electric power transmission coil CLA is a primary coil, and the electric power reception coil CLB is a secondary coil.

The coil CL may include one or more booster coils CLC disposed between the electric power transmission coil CLA and the electric power reception coil CLB. The booster coils CLC are disposed substantially parallel to each other, and half or more of opening surfaces formed by the booster coils CLC overlap with each other. An interval between a plurality of booster coils CLC is ensured, for example, to be larger than a radius of the booster coil CLC. The booster coil CLC assists electric power transmission of the electric power transmission coil CLA. The booster coil CLC may be a non-electric-power-supplied coil.

The electric power transmission coil CLA is provided in the electric power transmission apparatus 100. The electric power reception coil CLB is provided in the electric power reception apparatus 200. The booster coils CLC may be provided in the electric power transmission apparatus 100 or in the electric power reception apparatus 200, or may be provided separately in the electric power transmission apparatus 100 and the electric power reception apparatus 200. A part of the booster coils CLC may be provided in the electric power transmission apparatus 100, and the other part of the booster coils CLC may be provided in the electric power reception apparatus 200.

The electric power transmission apparatus 100 is installed in a watercraft 50. The electric power reception apparatus 200 is installed in a movable underwater vehicle 60 (for example, a submarine 70 or an underwater excavator 80) or an electric power reception apparatus that is fixedly installed (for example, a seismometer, a monitoring camera, or a geothermal power generator). Each coil CL is disposed in water (for example, in sea).

For example, the submarine 70 may include a remotely operated vehicle (ROV), an unmanned underwater vehicle (UUV), or an autonomous underwater vehicle (AUV).

A part of the watercraft 50 is above a water surface 90 (for example, a sea surface), that is, on the water, and the other part of the watercraft 50 is below the water surface 90, that is, underwater. The watercraft 50 is movable on the water and can move freely to, for example, the water of a data acquisition location. An electric wire 20 is connected between the electric power transmission apparatus 100 and the electric power transmission coil CLA of the watercraft 50. The electric wire 20 is connected to, for example, a driver 151 (see FIG. 2) in the electric power transmission apparatus 100 via a connector on the water (not shown).

The underwater vehicle 60 is in the water or on a water bottom 95 (for example, a sea bottom) and travels in the water or on the water bottom 95. For example, the underwater vehicle 60 can move freely to a data acquisition point according to an instruction from the watercraft 50 on the water. The instruction from the watercraft 50 may be transmitted by communication via each coil CL, or may be transmitted by other communication methods.

Each coil CL is connected to a connecting body 30 and the coils CL are arranged, for example, at equal intervals. A distance between adjacent coils CL (coil interval) is, for example, 5 m. The coil interval is, for example, about half of a diameter of the coil CL. A transmission frequency is, for example, 40 kHz or less and is preferably less than 10 kHz in consideration of an attenuation amount of a magnetic field intensity in the water (for example, in fresh water or in sea). The transmission frequency may also be 40 kHz or more. In a case where electric power is transmitted at a transmission frequency of 10 kHz or more, it is necessary to perform a predetermined simulation based on regulations of the Radio Act, and this operation can be omitted in cases of less than 10 kHz. An electric power transmission distance increases as the transmission frequency becomes lower, and the coil interval increases as the coil CL becomes larger.

The transmission frequency is determined based on coil characteristics such as an inductance of the coil CL, the diameter of the coil CL, the number of turns of the coil CL. The diameter of the coil CL is, for example, from several meters to several tens of meters. An electric resistance in the coil CL and electric power loss is lowered as a size of the coil CL increases, that is, as a wire diameter of the coil CL increases. Electric power transmitted via the coil CL is, for example, 50 W or more, and may be 1 kW or more.

Although the number of the connecting bodies 30 is three in FIG. 1, the present invention is not limited thereto. A weight 40 is connected to an end portion of the connecting body 30 on the side of the electric power reception coil CLB. A buoy 45 is connected to an end portion of the connecting body 30 on the side of the electric power transmission coil CLA.

Movement of the connecting body 30 can be restricted by the weight 40, and movement of each coil CL fixed to the connecting body 30 can thus be restricted. Therefore, even if a water flow is generated in the water, the movement of each coil CL is restricted by the weight 40, so that reduction in efficiency of electric power transmission using the coil CL can be inhibited.

In the connecting body 30, the weight 40 is connected to the end portion on the electric power reception coil CLB side, and the buoy 45 is connected to the end portion on the electric power transmission coil CLA side, so that the weight 40 is located on a water bottom side while the buoy 45 is located on a water surface side, and a posture, in which the connecting body 30 is substantially perpendicular to the water surface 90, can be maintained. Therefore, surfaces defined by each coil CL are substantially parallel to the water surface 90, and the electric power can be transmitted in a water depth direction (a direction substantially orthogonal to the water surface) by magnetic field resonance method.

The weight 40 may be detached from the connecting body 30 during transportation of the connecting body 30, and the weight 40 may be attached to the connecting body 30 when the transportation of the connection body 30 is completed and the connection body 30 is installed at a predetermined position. Accordingly, the transportation of the connecting body 30 is facilitated.

As shown in FIG. 2, the electric power transmission apparatus 100 includes a power supply 110, an AC/DC converter (ADC) 120, a central processing unit (CPU) 130, an information communication unit 140, and an electric power transmission circuit 150.

The ADC 120 converts AC power supplied from the power supply 110 into DC power. The converted DC power is transmitted to the electric power transmission circuit 150.

The CPU 130 generally controls operations of each unit of the electric power transmission apparatus 100 (for example, the power supply 110, the ADC 120, the information communication unit 140, and the electric power transmission circuit 150).

The information communication unit 140 includes a modulation and demodulation circuit 141 configured to modulate or demodulate communication data communicated between the information communication unit 140 and the electric power reception apparatus 200. The information communication unit 140 transmits, via the coil CL, control information from the electric power transmission apparatus 100 to the electric power reception apparatus 200, for example. The information communication unit 140 receives, via the coil CL, data from the electric power reception apparatus 200 to the electric power transmission apparatus 100, for example. This data includes, for example, data of exploration results obtained by underwater exploration or water bottom exploration of the electric power reception apparatus 200. Through the information communication unit 140, data communication can be quickly performed between the information communication unit 140 and the underwater vehicle 60 while the underwater vehicle 60 is performing operation such as data collection.

The electric power transmission circuit 150 includes the driver 151 and a resonance circuit 152. The driver 151 converts the DC power from the ADC 120 into an AC voltage (pulse waveform) having a predetermined frequency. The resonance circuit 152 includes a capacitor CA and the electric power transmission coil CLA, and generates a sinusoidal waveform AC voltage based on the pulse waveform AC voltage from the driver 151. The electric power transmission coil CLA resonates at a predetermined resonance frequency in accordance with the AC voltage applied from the driver 151. The electric power transmission coil CLA is impedance-matched with an output impedance of the electric power transmission apparatus 100.

The predetermined frequency according to the AC voltage obtained by the conversion of the driver 151 corresponds to the transmission frequency of the electric power transmission between the electric power transmission apparatus 100 and the electric power reception apparatus 200, and corresponds to the resonance frequency. In the present embodiment, the transmission frequency is set based on a Q factor of each coil CL.

As shown in FIG. 2, the electric power reception apparatus 200 includes an electric power reception circuit 210, a CPU 220, a charge control circuit 230, a secondary battery 240, and an information communication unit 250.

The electric power reception circuit 210 includes a rectifier circuit 211, a regulator 212, and a resonance circuit 213. The resonance circuit 213 includes a capacitor CB and the electric power reception coil CLB, and receives AC power transmitted from the electric power transmission coil CLA. The electric power reception coil CLB is impedance-matched with an input impedance of the electric power reception apparatus 200. The rectifier circuit 211 converts AC power induced in the electric power reception coil CLB to DC power. The regulator 212 converts DC voltage transmitted from the rectifier circuit 211 to a predetermined voltage suitable for charging the secondary battery 240.

The CPU 220 generally controls operations of each unit of the electric power reception apparatus 200 (for example, the electric power reception circuit 210, the charge control circuit 230, the secondary battery 240, and the information communication unit 250).

The charge control circuit 230 controls charging of the secondary battery 240 according to a type of the secondary battery 240. For example, in a case where the secondary battery 240 is a lithium ion battery, the charge control circuit 230 starts charging the secondary battery 240 at a constant voltage using DC power from the regulator 212.

The secondary battery 240 accumulates the electric power transmitted from the electric power transmission apparatus 100. The secondary battery 240 is, for example, a lithium ion battery.

The information communication unit 250 includes a modulation and demodulation circuit 251 configured to modulate or demodulate communication data communicated between the information communication unit 250 and the electric power transmission apparatus 100. The information communication unit 250 receives, via the coil CL, the control information from the electric power transmission apparatus 100 to the electric power reception apparatus 200, for example. The information communication unit 250 transmits, via the coil CL, the data from the electric power reception apparatus 200 to the electric power transmission apparatus 100, for example. This data includes, for example, data of exploration results obtained by underwater exploration or water bottom exploration of the electric power reception apparatus 200.

Through the information communication unit 250, data communication can be quickly performed between the information communication unit 250 and the watercraft 50 while the underwater vehicle 60 is performing operation such as data collection.

Similarly to the electric power transmission coil CLA and the electric power reception coil CLB, the booster coil CLC forms a resonance circuit together with a capacitor CC. That is, in the present embodiment, since the resonance circuit is arranged in multiple stages in the water, the electric power is transmitted by the magnetic resonance method.

Next, electric power transmission from the electric power transmission apparatus 100 to the electric power reception apparatus 200 will be described.

In the resonance circuit 152, when a current flows through the electric power transmission coil CLA of the electric power transmission apparatus 100, a magnetic field is generated around the electric power transmission coil CLA. Oscillation of the generated magnetic field is transmitted to the resonance circuit including the booster coil CLC that resonates at the same frequency or the resonance circuit 213 including the electric power reception coil CLB.

In the resonance circuit including the booster coil CLC, a current is excited in the booster coil CLC by the oscillation of the magnetic field, the current flows, and a magnetic field is further generated around the booster coil CLC. Oscillation of the generated magnetic field is transmitted to a resonance circuit including another booster coil CLC that resonates at the same frequency or the resonance circuit 213 including the electric power reception coil CLB.

In the resonance circuit 213, an alternating current is induced in the electric power reception coil CLB by the oscillation of the magnetic field of the booster coil CLC or the electric power transmission coil CLA. The induced alternating current is rectified, converted to a predetermined voltage, and charged to the secondary battery 240.

Coil Structure

Next, a structure of the coil CL will be described.

When the coil CL is used, the coil CL is submerged in water and disposed in water. The coil CL preferably adopts a structure that can prevent reduction in the Q factor of the coil CL as much as possible, so as to transmit electric power by a non-contact transmission method (in the present embodiment, the magnetic resonance method).

According to the coil CL described below, a waterproof structure is adopted, which inhibits water from entering space between windings (electric wires) of the coil CL in the water, so that the reduction in the Q factor of the coil CL can be inhibited, and reduction in efficiency of underwater electrical power transmission using the coil CL can be inhibited.

Figure 3A:
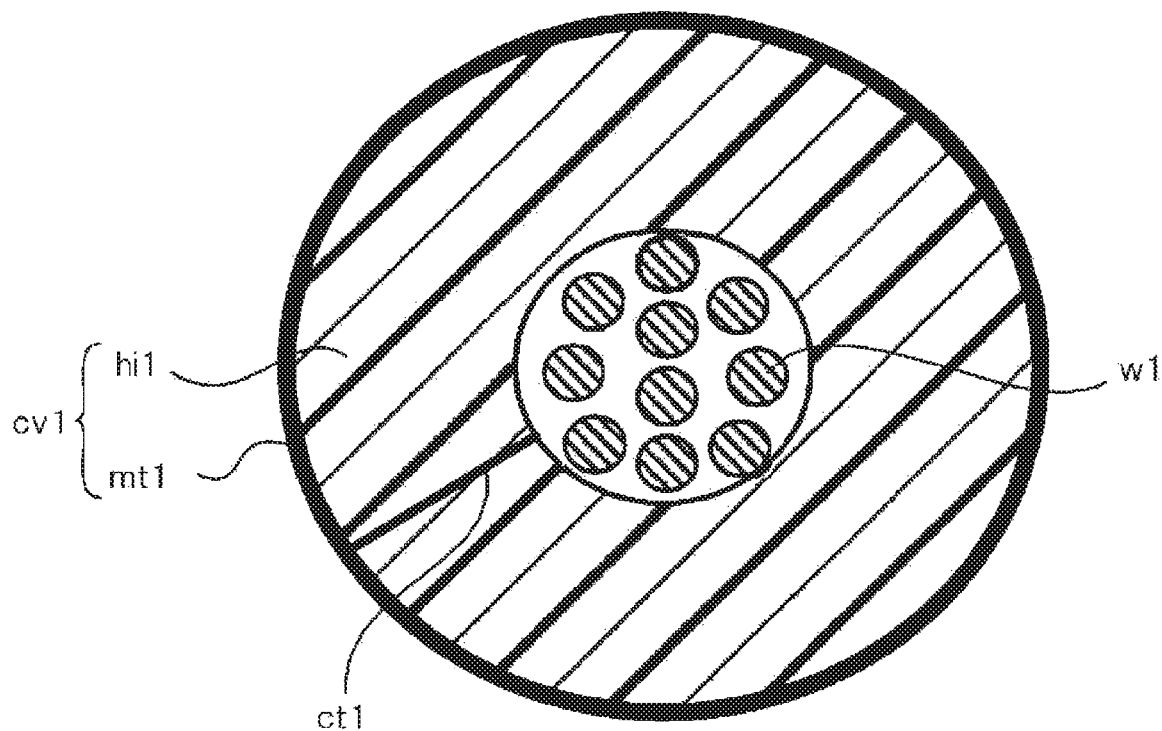
FIG. 3A is a cross-sectional view showing a structure of a coil according to the first embodiment.

FIG. 3A is a cross-sectional view showing a structure of a coil CL1 (an example of the coil CL). The coil CL1 has a structure in which electric wires w1 wound in a ring shape (annular shape), a tubular surrounding member hi1 surrounding outer peripheral surfaces of the electric wires w1 in a radial direction, and a self-bonding tape mt1 wound around an outer peripheral surface of the surrounding member hi1 are concentrically overlapped with each other. A litz wire may be used as the electric wire w1.

The litz wire may be a wire in which a plurality of enamel wires, which are coated metal wires, are twisted so that a high-frequency current can easily flow through. The litz wire is a relatively expensive wire. Through using a plurality of enamel wires to increase a surface area, an electric resistance is reduced, due to a skin effect, when the high-frequency current flows to a surface.

The surrounding member hi1 is formed of a material having at least one of a non-magnetic property and a non-conductive property. Since the surrounding member hi1 is non-magnetic, in the coil CL1, strength of a magnetic field generated due to an alternating current flowing in the electric wire w1 and a magnetic field generated due to resonance with a magnetic field of another coil CL can be inhibited from being absorbed by the surrounding member hi1. Therefore, by maintaining the strength of the magnetic field, the coil CL1 can inhibit the reduction in transmission efficiency when the electric power is transmitted via the magnetic field. Since the surrounding member hi1 is non-conductive, in the coil CL, a current flowing through the electric wire w1 can be inhibited from being transmitted to the water, which has high electric conductivity, via the surrounding member hi1. Therefore, the coil CL1 can maintain magnitude of the current, maintain the strength of the magnetic field generated on the basis of the current, and inhibit the reduction in the transmission efficiency when the electric power is transmitted via the magnetic field.

A surrounding member hi may have flame retardancy so that the surrounding member hi is difficult to burn even when the electric wire w1 generates heat when electric power is supplied to the electric wire w1. That is, the surrounding member hi1 may be formed of a material having flame retardancy. Accordingly, safety is improved with respect to combustion of the coil CL.

The surrounding member hi1 may be formed of a flexible or elastic rubber (an example of resin). Accordingly, since the surrounding member hi1 has flexibility or elasticity, the surrounding member hi can be easily processed to fit with a shape of the coil CL1 (for example, a shape wound in a circular shape).

As a specific material of the surrounding member hi1, for example, chloroprene rubber, vinyl chloride resin, polyethylene resin, or silicone resin may be used. A heat insulating material for air conditioner piping may be used as the surrounding member hi1. Accordingly, a general-purpose product can be used in the coil CL1 to surround the electric wire w1, and a cost for obtaining the waterproof structure can be reduced. Materials other than the materials exemplified above may be used as the material of the surrounding member hi1.

The surrounding member hi1 may have a thickness equal to or greater than ½ of a diameter of the electric wire w1. For example, as in FIG. 7 described below, the electric wire w1 may have a diameter of 18.3 mm. A size (outer diameter) of the surrounding member hi1 surrounding outside the electric wire w1 may be 41.5 mm. In this case, the thickness of the surrounding member hi1 is 11.6 mm (=(41.5−18.3)/2), which satisfies the requirement that the thickness of the surrounding member hi1 is equal to or greater than ½ of the diameter of the electric wire w1. Accordingly, the surrounding member hi1 can serve as a spacer, and a distance from an outer surface of the electric wire w1 to the water can be increased. Therefore, the magnetic field generated by flowing of the alternating current through the coil CL1 hardly leaks into the water, and the coil CL1 can inhibit the reduction in the efficiency of the electric power transmission via the magnetic field.

In order to insert the electric wire w1 into the surrounding member hi1 from a radial direction outer side along a longitudinal direction of the surrounding member hi1 (a direction in which the surrounding member hi1 extends), a notch ct1 extending from outside to inside in the radial direction of the surrounding member hi1 is formed in the surrounding member hi1 (see FIG. 3A). The electric wire w1 is covered with the tubular surrounding member hi1 by opening a portion of the notch ct1 and accommodating the electric wire w1 inside the surrounding member hi1.

The self-bonding tape mt1 is formed of a non-magnetic and non-conductive material. When the self-bonding tape mt1 is wound around the surrounding member hi1, for example, butyl rubber of an adhesive layer flows out over time, so that the self-bonding tape mt1 has a function of filling space existing in a portion where the self-bonding tape mt1 and the surrounding member hi1 overlap with each other. Therefore, when the coil CL1 is submerged in the water, the self-bonding tape mt1 can inhibit the water from entering an inner side of the surrounding member hi1 through the notch ct1 formed in the surrounding member hi1. That is, the self-bonding tape mt1 has a function of serving as a waterproof tape that closes a gap formed by the notch ct1. The self-bonding tape mt1 also has a function of serving as a reinforcing tape that prevents the electric wire w1 from going out of the surrounding member hi1. A thickness of the self-bonding tape mt1 is, for example, 100 micron or more, and may be 0.25 mm, 0.1 mm, or the like.

The surrounding member hi1 surrounding the electric wire w1, and the self-bonding tape mt1 are also collectively referred to as a cover member cv1. The cover member cv1 seals a periphery (including a radial direction outer periphery) of the electric wire w1. The coil CL1 is manufactured by winding the electric wires w1 covered with the cover member cv1 in a helical manner or spiral manner. When the coil CL1 is submerged in the water, since the cover member cv1 covers the periphery of the electric wire w1, a thickness of the cover member cv1 serves as a spacer, and a distance between the water in the water and the electric wire w1 is increased.

Therefore, in the coil CL1, the magnetic field is more difficult to leak into the water, and the reduction in the electric power transmission efficiency can be inhibited. The coil CL1 can inhibit dielectric loss caused by water (for example, sea water or fresh water) having properties of serving as a dielectric. Therefore, the coil CL1 can inhibit the reduction in the Q factor of the coil CL1, and can inhibit the reduction in the transmission efficiency of the non-contact electric power transmission.

Figure 3B:
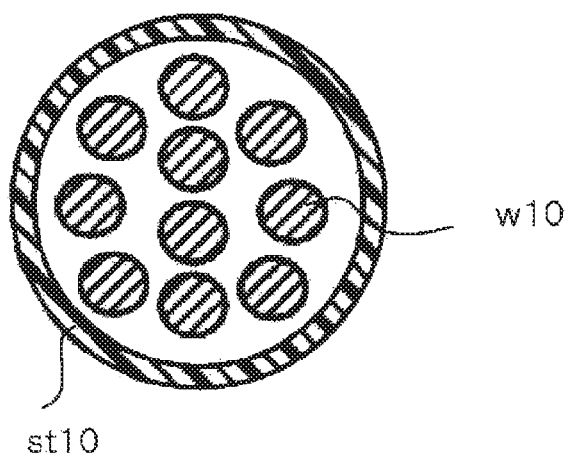
FIG. 3B is a cross-sectional view showing a structure of a coil of a comparative example.

FIG. 3B is a cross-sectional view showing a structure of a coil CL10 of a comparative example. The coil CL10 of the comparative example is a coil in which electric wires w10 wound in a ring shape (annular shape) are bundled by a spiral tube st10. Since the spiral tube st10 has a plurality of notches from outside to inside in the radial direction, water may enter from notched portions. Therefore, the coil CL10 does not have the waterproof structure.

in the coil CL10, since the electric wire w10 covered with a coating layer of an enamel wire directly contacts the water, the coil CL10 is easily short-circuited with the water, which is a conductor. Since there is no distance from the electric wire w10 to the water in the water, the magnetic field leaks easily. In a case where the water is sea water, electric power loss, caused by an eddy current of the sea water, easily occurs. Dielectric loss caused by the water easily occurs. When the water contacts the electric wire w10, the electric wire w10 is easily corroded and deteriorated, and a life of the electric wire w10 may be shortened.

Next, performance of the coil CL1 of the present embodiment and the coil CL10 of the comparative example will be described.

First, inductance (L) and Q factors of the coils CL1 and CL10 are compared and discussed. FIG. 4A is a table showing measurement conditions of the inductance (L) and the Q factors. The inductance (L) and the Q factors are measured in space (in air), fresh water (in fresh water), sea water (in sea water). Temperatures (° C.) of the space, fresh water, and sea water may be 24.5 degrees, 25.7 degrees, and 24.8 degrees, respectively. Conductivity of the coil may be 0.01224 (S/m) in the fresh water, 5.16 (S/m) in the sea water. A salt concentration of the sea water may be 3.4%.

The measurement results of FIGS. 4B to 4E are results of each value measured under the measurement conditions shown in FIG. 4A. In FIGS. 4B to 4E, alternating currents of predetermined frequencies (for example, 40 kHz, 80 kHz) were applied to the electric wires w1, w10 of the coils CL1, CL10, and each value was measured.

FIG. 4B is a table showing measurement results of inductance (L) and a Q factor of the coil CL10 which is not provided with the cover member cv1 at a frequency of 40 kHz. The inductance (L) of the coil CL10 is 135 μH, 145 μH, and 145 μH, respectively, in the space, fresh water, and sea water. The inductance (L) of the coil CL10 slightly increases in the fresh water and sea water as compared with the inductance (L) in the space. The Q factor of the coil CL10 is 361, 282, 195, respectively, in the space, fresh water, and sea water. The Q factor decreases in the fresh water and is further decreased in the sea water, as compared with the Q factor in the space. This is considered to be a result of the fact that electric power loss (dielectric loss) is caused by capacitive components of the fresh water or the sea water, which have the property of serving as dielectrics. Specifically, it is considered that capacitance is generated due to water entering space between windings of the coil CL10, dielectric loss components of the sea water increases a series resistance of the coil CL10, so the electric power loss of the coil CL10 is increased, and the transmission efficiency is reduced. Since the conductivity of the sea water is higher than the conductivity of the fresh water, it is considered that there is more electric power loss due to eddy currents.

FIG. 4C is a table showing measurement results of the inductance (L) and the Q factor of the coil CL1 that includes the cover member cv1 at the frequency of 40 kHz. The inductance (L) of the coil CU is 135 μH, 135 μH, and 134 μH, respectively, in the space, fresh water, and sea water. The inductance of the coil CL1 is substantially the same in the space, fresh water, and sea water. The Q factor of the coil CL1 is 371, 381, and 301, respectively, in the space, fresh water, and sea water. The Q factor is slightly higher in the fresh water and slightly lower in the sea water as compared with the Q factor in the space. This is considered to be a result of the fact that the fresh water or sea water does not reach the electric wire w1 due to the cover member cv1, and a distance is secured from the electric wire w1 to the water in the water or the sea water in sea, so that influence of the fresh water and sea water is reduced. The influence of the fresh water and sea water may include dielectric loss caused by contacting the coil CL1 with the water, and eddy current loss caused by approaching the coil CL1 to the water (particularly, sea water).

FIG. 4D is a table showing measurement results of the inductance (L) and the Q factor of the coil CL10 which is not provided with the cover member cv1 at a frequency of 80 kHz. The inductance (L) of the coil CL10 is 136 µH, 147 µH, and 148 µH, respectively, in the space, fresh water, and sea water. The inductance of the coil CL10 slightly increases in the fresh water and sea water as compared with the inductance in the space. The Q factor of the coil CL10 is 663, 177, and 164, respectively, in the space, fresh water, and sea water. The Q factor decreases in the fresh water and is further decreased in the sea water, as compared with the Q factor in the space. This is considered to be a result of the fact that large electric power loss (dielectric loss) is caused by the capacitive components of the fresh water or the sea water, which have the property of serving as dielectrics. Specifically, it is considered that capacitance is generated due to water entering space between windings of the coil CL10, dielectric loss components of the sea water increases a series resistance of the coil CL10, so the electric power loss of the coil CL10 is increased, and the transmission efficiency is reduced. Since the conductivity of the sea water is higher than the conductivity of the fresh water, it is considered that there is larger electric power loss due to eddy currents.

FIG. 4E is a table showing measurement results of the inductance (L) and the Q factor of the coil CL1 that includes the cover member cv1 at the frequency of 80 kHz. The inductance (L) of the coil CL1 is the same value 135, 135, and 135 µH, respectively, in the space, fresh water, and sea water. The Q factor of the coil CL1 is 670, 679, and 341, respectively, in the space, fresh water, and sea water. The Q factor is slightly higher in the fresh water and significantly lower in the sea water as compared with the Q factor in the space. This is considered to be a result of the fact that the fresh water or sea water does not reach the electric wire w1 due to the cover member cv1, and a distance is secured from the electric wire w1 to the water in the water or the sea water in sea, so that influence of the fresh water and sea water is reduced. The influence of the fresh water and sea water may include dielectric loss caused by contacting the coil CL1 with the water, and eddy current loss caused by approaching the coil CL1 to the water (particularly, sea water).

Next, transmission efficiency of non-contact electric power transmission using the coil CL1 of the present embodiment and the coil CL10 of the comparative example will be described.

Figure 5A:
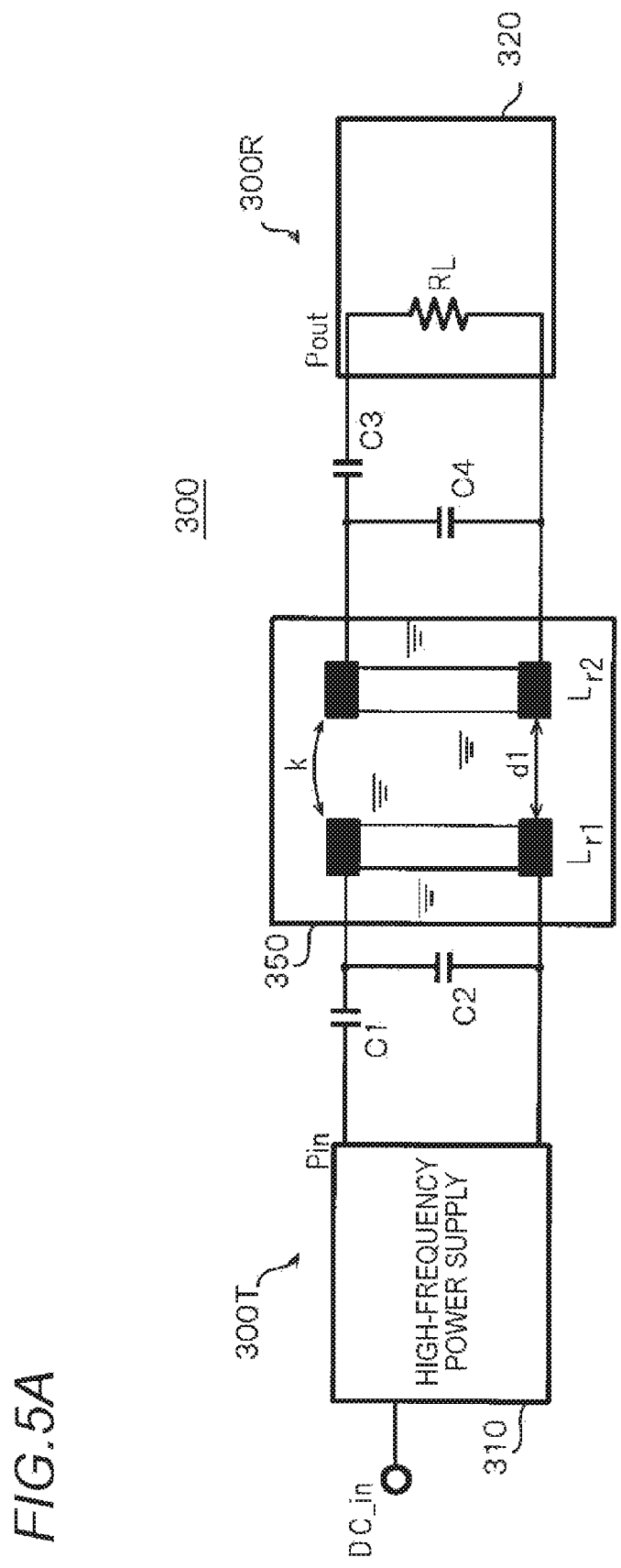
FIG. 5A shows a configuration of a transmission efficiency measuring circuit for measuring electric power transmission efficiency.

FIG. 5A shows a configuration example of a transmission efficiency measuring circuit 300 for measuring the transmission efficiency of the non-contact electric power transmission. The transmission efficiency measuring circuit 300 measures the transmission efficiency for the non-contact electric power transmission. The transmission efficiency measuring circuit 300 includes an electric power transmission circuit 300T and an electric power reception circuit 300R. Here, as an example, a case where the transmission efficiency is measured at electric power transmission frequencies of 40 kHz and 80 kHz is shown. The electric power transmission frequency is lowered as the diameter of the coil increases. For example, if the diameter of the coil is longer than 5 m, the electric power transmission frequency is about 1 kHz or less. For example, if the diameter of the coil is equal to or less than 5 m, the electric power transmission frequency is higher than about 1 kHz.

The electric power transmission circuit 300T includes a high-frequency power supply circuit 310, capacitors C1, C2, and an electric power transmission coil Lr1. The high-frequency power supply circuit 310 is input with a DC voltage and generates an electric power transmission signal having a frequency of 40 kHz. The capacitors C1, C2, and the electric power transmission coil Lr1 form an LC resonance circuit that resonates at 40 kHz. Inductance of the electric power transmission coil Lr1 is, for example, 145 µH.

The electric power reception circuit 300R includes a load apparatus 320, capacitors C3, C4, and an electric power reception coil Lr2. The load apparatus 320 incorporates a load resistor RL. The load resistor RL is, for example, 10Ω. Similarly to the electric power transmission circuit 300T, the capacitors C3, C4 and the electric power reception coil Lr2 form an LC resonance circuit that resonates at 40 kHz. Inductance of the electric power reception coil Lr2 is, for example, 145 µH.

The transmission efficiency measuring circuit 300 includes a power analyzer (not shown) that analyzes transmission efficiency of electric power. The power analyzer acquires transmitted electric power in the electric power transmission circuit 300T, acquires received electric power in the electric power reception circuit 300R, and derives the transmission efficiency based on the transmitted electric power and the received electric power.

For example, the transmission efficiency measuring circuit 300 may detect a current I1 flowing through a resistor R included in the high-frequency power supply circuit 310 and calculate and acquire an electric power value (transmitted electric power value) represented by $(I1)^2 \times R$. The transmitted electric power may be electric power of a point Pin of the high-frequency power supply circuit 310. For example, the transmission efficiency measuring circuit 300 may detect a current I flowing through the load resistor $R_L$ and calculate and acquire an electric power value (received electric power value) represented by $I^2 \times R_L$. That is, the received electric power may be electric power of a point Pout of the load apparatus 320.

The transmission efficiency measuring circuit 300 may calculate the transmission efficiency using Equation (1) based on the transmitted electric power and the received electric power.

$$\text{Transmission Efficiency} = \text{Received Electric Power}/\text{Transmitted Electric Power} \times 100(\%) \quad (1)$$

Specifically, in FIG. 5A, assuming that the electric power transmission is performed in the sea water, the electric power transmission coil Lr1 and the electric power reception coil Lr2 are accommodated in a container 350 containing the sea water. A distance d1 between the electric power transmission coil Lr1 and the electric power reception coil Lr2 may be 80 mm.

A coupling coefficient k between the electric power transmission coil Lr1 and the electric power reception coil Lr2 may be 0.099. The coupling coefficient k may be represented by Equation (2).

$$k = M/(L1 \times L2)^{1/2} \quad (2)$$

Here, M refers to mutual inductance, L1 refers to self-inductance of the electric power transmission coil Lr1, and L2 refers to self-inductance of the electric power reception coil Lr2. The self-inductance of the electric power transmission coil Lr1 and the self-inductance of the electric power reception coil Lr2 are both 145 µH. The coupling coefficient k is a value ranging from a maximum value k=1 to a minimum value k=0.

FIG. 5B is a plan view showing shapes of the electric power transmission coil Lr1 and the electric power reception coil Lr2. FIG. 5C is a cross-sectional view showing the shapes of the electric power transmission coil Lr1 and the electric power reception coil Lr2 as viewed from a direction of arrow E-E in FIG. 5B. The electric power transmission coil Lr1 and the electric power reception coil Lr2 may have the same specification. The number of windings N of the electric power transmission coil Lr1 and the electric power reception coil Lr2 may be 22. An outer diameter, an inner diameter, and a thickness of the electric power transmission coil Lr1 and the electric power reception coil Lr2 may be φ174 mm, φ134 mm, and 21.6 mm, respectively. A φ0.05 mm×1200 litz wire may be used as an electric wire of the electric power transmission coil Lr1 and the electric power reception coil Lr2.

Sizes of the electric power transmission coil Lr1 and the electric power reception coil Lr2 shown in FIG. 5C may be sizes that do not include the cover member cv1 and the spiral tube st10. That is, the electric power transmission coil Lr1 and the electric power reception coil Lr2 may be the wound wires w1, w10.

FIG. 6A is a table showing measurement conditions of the transmission efficiency of the non-contact electric power transmission. Similar to the measurement conditions of the inductance (L) and the Q factor, the transmission efficiency is measured in the space (in the air), fresh water (in the fresh water), sea water (in the sea water). Temperatures (° C.) of the space, fresh water, and sea water may be 24.5 degrees, 25.7 degrees, and 24.8 degrees, respectively. Conductivity of the fresh water may be 0.01224 (S/m) and conductivity of the sea water may be 5.16 (S/m). A salt concentration of the sea water may be 3.4%.

Measurement results of FIGS. 6B and 6C are results of each value measured under the measurement conditions shown in FIG. 6A using the transmission efficiency measuring circuit 300 of FIG. 5A. In FIGS. 6B and 6C, alternating currents of predetermined frequencies (for example, 40 kHz, 80 kHz) were applied to the electric wires w1, w10 of the cods CL1, CL10, and each value was measured. The coil CL1 including the cover member cv1 may be configured such that the cover member cv1 is mounted on the electric wire w1 shown in the electric power transmission coil Lr1 or the electric power reception coil Lr2. The coil CL10 which is not provided with the cover member cv1 may be configured such that the spiral tube st10 is mounted on the electric wire w10 shown in the electric power transmission coil Lr1 or the electric power reception coil Lr2.

FIG. 6B is a table showing measurement results of the electric power transmission efficiency at the frequency of 40 kHz in a case where the cover member cv1 is provided (covered by the cover member cv1) and in a case where the cover member cv1 is not provided (not covered by the cover member cv1). When the electric power transmission coil Lr1 and the electric power reception coil Lr2 which were not provided with the cover member cv1 were used, the transmission efficiency was 94.4%, 90.6%, and 88.7%, respectively, when measured in the space, fresh water, and sea water. Meanwhile, when the electric power transmission coil Lr1 and the electric power reception coil Lr2 including the cover member cv1 were used, the transmission efficiency was 94.8%, 95.1%, and 94.0%, respectively, when measured in the space, fresh water, and sea water. Referring to the measurement results, it is understood that the transmission efficiency is lowered in the fresh water or sea water in the case where the coil CL10 which is not provided with the cover member cv1 is used, as compared with the transmission efficiency in the space. Meanwhile, in the case where the coil CL1 including the cover member cv1 is used, the transmission efficiency in the fresh water or sea water is not much different from the transmission efficiency in the space. That is, in the case where the coil CL1 including the cover member cv1 is used, the reduction in the transmission efficiency in the fresh water or sea water is inhibited as shown in FIG. 4C, as compared with the case where the coil CL10 which is not provided with the cover member cv1 is used.

FIG. 6C is a table showing measurement results of the electric power transmission efficiency at the frequency of 80 kHz in a case where the cover member cv1 is provided and in a case where the cover member cv1 is not provided. When the electric power transmission coil Lr1 and the electric power reception coil Lr2 which were not provided with the cover member cv1 were used, the transmission efficiency was 96.0%, 89.0%, and 84.3%, respectively, when measured in the space, fresh water, and sea water. Meanwhile, when the electric power transmission coil Lr1 and the electric power reception coil Lr2 including the cover member cv1 were used, the transmission efficiency was 96.1%, 96.8%, and 93.3%, respectively, when measured in the space, fresh water, and sea water. Referring to the measurement results, it is understood that even when the frequency is 80 kHz, the transmission efficiency is lowered in the fresh water or sea water in the case where the coil CL10 which is not provided with the cover member cv1 is used, as compared with the transmission efficiency in the space. Meanwhile, in the case where the coil CL1 including the cover member cv1 is used, the transmission efficiency in the fresh water or sea water is not much different from the transmission efficiency in the space. That is, even when the transmission frequency is 80 kHz, in the case where the coil CL1 including the cover member cv1 is used, the reduction in the transmission efficiency in the fresh water or sea water is inhibited as shown in FIG. 4E, as compared with the case where the coil CL10 which is not provided with the cover member cv1 is used.

In this way, referring to FIGS. 4B to 4E, 6B and 6C, it can be understood that when the coil CL1 is used, in which the cover member cv1 is mounted on the electric wire w1, characteristic change of each value at the transmission frequency of 40 kHz or more is smaller than the case where the coil CL10 is used, in which the cover member cv1 is not mounted on the electric wire w10. It is considered that reduction in the characteristic change includes dielectric loss (tan δ) caused by the water entering the space between the windings of the coil.

In this way, in the coil CL1 of the first embodiment, the waterproof structure is realized by surrounding and sealing the electric wire w1 with the cover member cv1. Accordingly, the coil CL1 can inhibit the water from entering the space between wires of the electric wire w1 of the coil CL1, so that reduction in the Q factor of the coil CL1 can be inhibited. By making the coil CL1 waterproof, it is difficult for the water to enter the coil CL1, thereby making it difficult for the electric wire w1 to short-circuit, thus voltage endurance of the coil CL1 can be improved. Accordingly, the coil CL1 can transmit high electric power with an increased voltage. The coil CL1 can improve long-term reliability of the electric wire w1 by preventing water or sea water from entering the electric wire w1.

By securing a thickness of the tubular surrounding member hi to a certain extent (for example, ½ or more of the diameter of the electric wire w1), a long distance can be secured between the electric wire w1 and the water in the water by a thickness of the cover member cv1. Therefore, the coil CL1 can inhibit the electric power loss caused by the eddy current in the sea water. Therefore, the coil CL1 can further inhibit the reduction in the electric power transmission efficiency when the non-contact electric power transmission is performed.

Modification 1 of the First Embodiment

Figure 7:
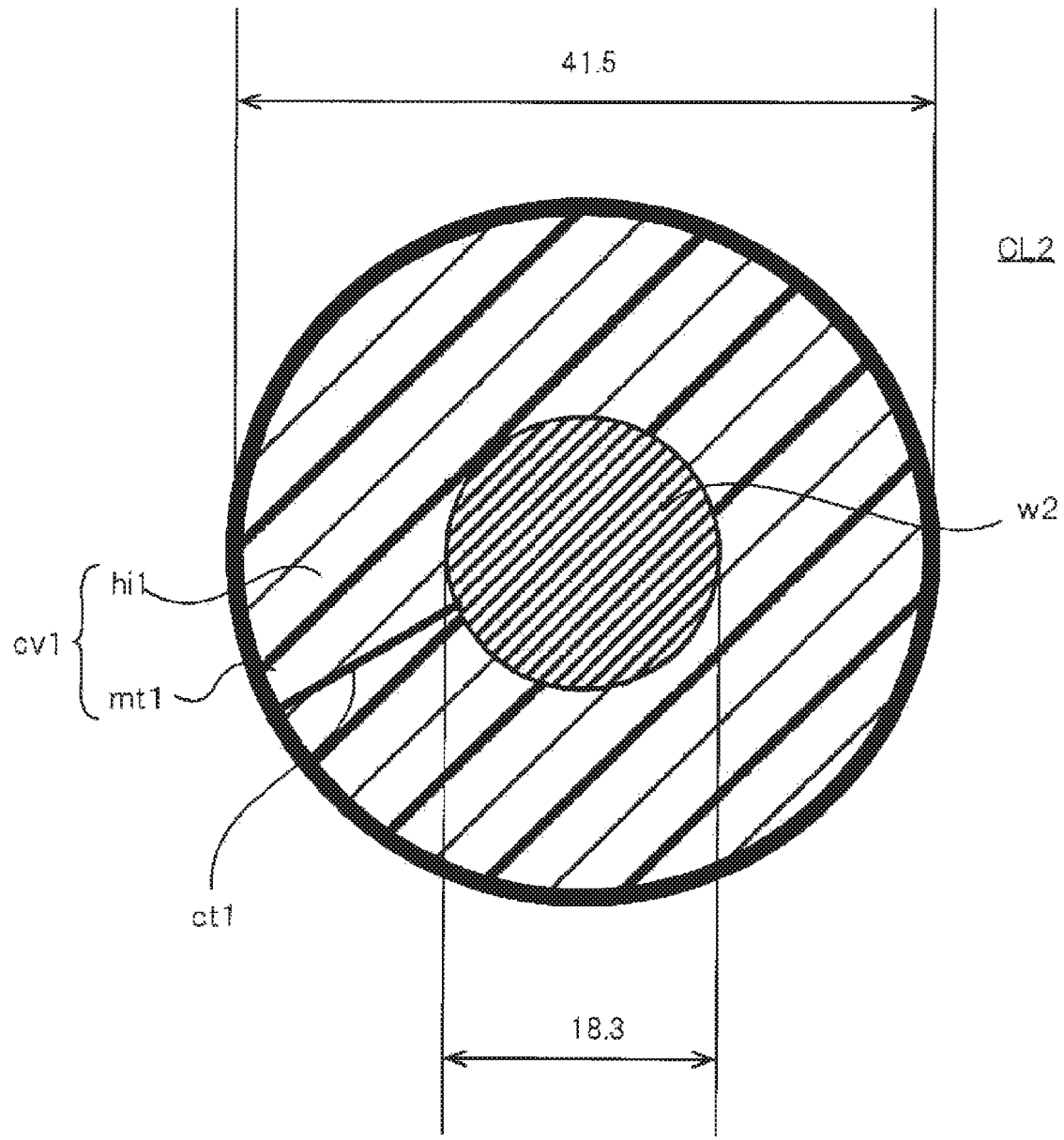
FIG. 7 is a cross-sectional view showing a structure of a coil according to Modification 1 of the first embodiment.

FIG. 7 is a cross-sectional view showing a structure of a coil CL2 (an example of the coil CL) according to Modification 1 of the first embodiment. The coil CL2 has a structure in which electric wires w2 wound in a ring shape (annular shape), the tubular surrounding member hi1 surrounding outer peripheral surfaces of the electric wires w2 in a radial direction, and the self-bonding tape mt1 wound around the outer peripheral surface of the surrounding member hi1 are concentrically overlapped with each other. A size of the coil CL2 exemplified in FIG. 7 may be the same as a size of the coil CL1 described in the first embodiment. Sizes shown in FIG. 7 may be measurement (simulation) sizes, and the electric power transmission coil CLA, the electric power reception coil CLB, and the booster coil CLC used actually in the electric power transmission apparatus 100 and the electric power reception apparatus 200 may be larger than the sizes.

In the coil CL2, a single wire is used as the wire instead of the litz wire. The single wire is inexpensive and available as compared with the litz wire. The single wire has a stronger mechanical strength than a twisted wire. Therefore, the coil CL2 is difficult to break and is easy to process.

The electric wire w2, which is a single wire, may have a diameter of 18.3 mm. A size (outer diameter) of the cover member cv1 surrounding the electric wire w2 may be 41.5 mm. The thickness of the cover member cv1 may be 11.6 mm (=(41.5−18.3)/2). Therefore, when the coil CL2 is submerged in water, a distance from the electric wire w2 to the water in the water is equal to or greater than 11.6 mm (the thickness of the cover member cv1), and is equal to or greater than ½ of the diameter of the electric wire w1 (=18.3/2). Accordingly, the coil CL2 can inhibit the electric power loss caused by the eddy current in the sea water even when a high frequency current flows through the coil CL2.

In this way, according to the coil CL2 of Modification 1, by using the single wire electric wire w2 instead of the litz wire electric wire w1, the electric wire w2 and the coil CL2 can be manufactured relatively inexpensively. The material of the coil CL2 is available, and the coil CL2 can be easily processed.

Modification 2 of the First Embodiment

Figure 8:
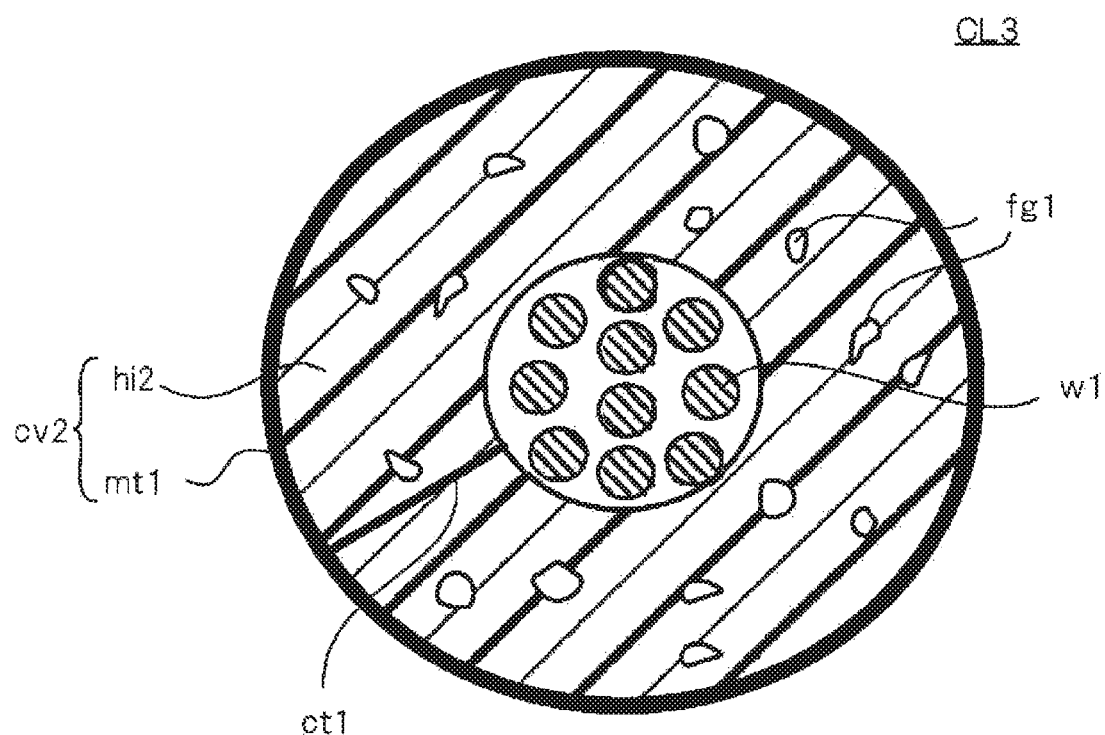
FIG. 8 is a cross-sectional view showing a structure of a coil according to Modification 2 of the first embodiment.

FIG. 8 is a cross-sectional view showing a structure of a coil CU (an example of the coil CL) according to Modification 2 of the first embodiment. The coil CU includes a tubular surrounding member hi2, which includes ferrite fg1, instead of the tubular surrounding member hi1. That is, a cover member cv2 is formed by the surrounding member hi2 and a self-bonding tape mt1.

The ferrite fg1 includes iron oxide as a main component, and is a soft magnetic material having high magnetic permeability. By mixing the granular ferrite fg1 into the tubular surrounding member hi2, a magnetic field generated by an AC current flowing through the annularly wound electric wire w1 is concentrated so as to pass through the ferrite fg1 scattered inside the cover member cv2. As a result, the magnetic field hardly leaks to a radial direction outer side of the coil CL3, and the magnetic field is enlarged.

As described above, according to the coil CL3 of Modification 2, a magnetic material such as the ferrite is made granular and mixed into the cover member cv2 that covers the electric wire w1, so that the magnetic field generated in the coil CL3 is concentrated inside the cover member cv2, and hardly leaks to the radial direction outer side of the coil CL3. As a result, a Q factor of the coil CL3 is improved, and the reduction in the transmission efficiency is inhibited. Therefore, the coil CL3 can maintain the transmission efficiency and improve waterproof performance.

The magnetic material mixed in the surrounding member hi2 may be a magnetic material other than the ferrite. For example, silicon steel, permalloy, sendust, or the like may be used. The tubular surrounding member hi2, in which the magnetic material such as the ferrite is mixed, may also be used in the coil CL2 using the electric wire w2 of Modification 1 and the electric power transmission efficiency is improved similarly.

Second Embodiment

In the first embodiment, the case where the waterproof structure is realized by surrounding the electric wire with the cover member cv1 is shown. In the second embodiment, the waterproof structure is realized by molding the electric wire with resin. The coil CL of the second embodiment is manufactured by a helical winding that is spirally wound in an electric power transmission direction.

In the helical winding, the coil CL is wound in two or more turns so as to be overlapped in the transmission direction. Each electric wire is molded with resin so that an outer peripheral surface thereof is covered, so that sea water does not enter space between the electric wires in the coil CL. The number of turns of the wound electric wire is, for example, five turns, and may be any number of turns as long as the number of turns is two or more.

Figure 9:
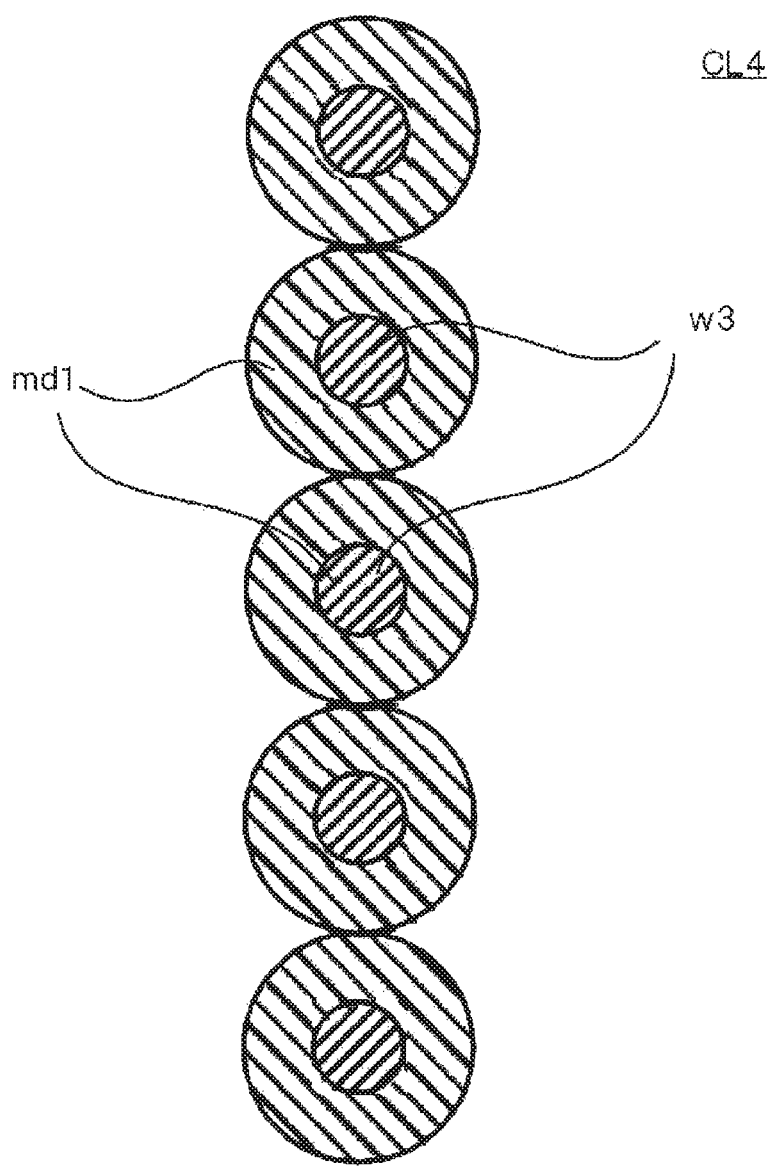
FIG. 9 is a cross-sectional view showing a structure of a coil according to a second embodiment.

FIG. 9 is a cross-sectional view showing a structure of a coil CLA (an example of the coil CL) according to the second embodiment. In FIG. 9, in the coil CL4, each electric wire w3 is covered with a molded portion md1 and is wound by five times. The coil CL4 may be integrated by winding each electric wire w3 covered with the molded portion md1 by five times and then tying the electric wires w3 by a tying band. The coil CLA may also be integrated by winding the electric wires w3 by five turns and arranging the electric wires w3 of each winding in one line at intervals, and then molding the electric wires w3 with a resin mold.

The molded portion md1 is molded by filling a resin mold material, for example. A material that is non-magnetic and non-conductive is used as the mold material. Chloroprene rubber, vinyl chloride resin, or the like, which has excellent insulating property and is easy to process, may be used as the material. Further, a flame retardant mold material may be used, which does not melt even when heated.

As in the first embodiment, the wire of each electric wire w3 may be a litz wire or a single wire. The electric wire w3 may be covered or may not be covered. Even in this case, for example, water is inhibited by the molded portion md1 from entering the space between the windings of the electric wire w3, so that the reduction in the transmission efficiency can be inhibited, and short circuit between the windings can be inhibited.

As in the first embodiment, a thickness of the molded portion md1 in a radial direction may be equal to or larger than ½ of a diameter of the electric wire w3. In this case, the molded portion md1 can serve as a spacer, and a distance from an outer surface of the electric wire w3 to the water can be increased. Therefore, a magnetic field generated by flowing of alternating current through the coil CL4 hardly leaks into the water, and the coil CL4 can inhibit the reduction in the efficiency of the electric power transmission via the magnetic field. Since the molded portion md1 has the thickness described above, the coil CL4 can inhibit heat generation caused by eddy currents of another electric wire (for example, an electric wire of a second turn) adjacent to a wound electric wire (for example, an electric wire of a first turn), and the transmission efficiency can be improved.

As described above, according to the coil CL4 of the second embodiment, the molded portion md1 is formed so as to cover the outer peripheral surface of each electric wire w3 which is a bundle having two or more turns. Therefore, the coil CL4 can be manufactured relatively inexpensively. Since the electric wire w3 is surrounded by the molded portion md1, a waterproof property and a mechanical strength can be improved.

In the coil CL4, the waterproof structure is realized by surrounding and sealing the electric wire w3 with the molded portion md1. Accordingly, the coil CLA can inhibit the water from entering the space between the windings of the electric wire w3 of the coil CL4, so that reduction in a Q factor of the coil CL4 can be inhibited. By making the coil CLA waterproof, it is difficult for the water to enter the coil CL4, thereby making it difficult for the electric wire w3 to short-circuit, thus voltage endurance of the coil CL4 can be improved. Accordingly, the coil CLA can transmit high electric power with an increased voltage. The coil CL4 can improve long-term reliability of the electric wire w3 by preventing water or sea water from entering the electric wire w3.

By securing a thickness of the molded portion md1 to a certain extent for example, ½ or more of the diameter of the electric wire w3), a long distance can be secured between the electric wire w3 and the water in the water. Therefore, the coil CLA can inhibit the electric power loss caused by the eddy current in the sea water. Therefore, the coil CLA can further inhibit the reduction in the electric power transmission efficiency when the non-contact electric power transmission is performed.

Although the helical coil is mainly exemplified here, the coil CL4 of the second embodiment can be similarly applied to a case where the coil CLA is manufactured by a spiral winding that is wound in a horizontal direction perpendicular to the electric power transmission direction.

Modification of the Second Embodiment

Figure 10:
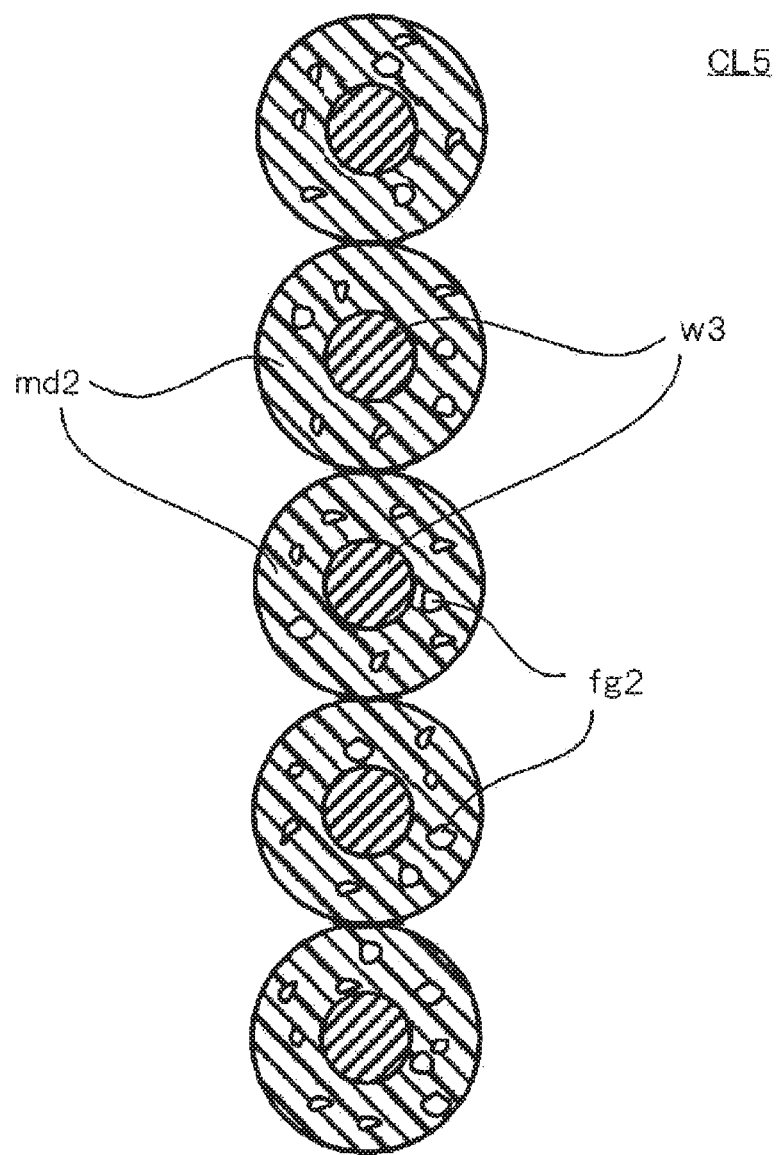
FIG. 10 is a cross-sectional view showing a structure of a coil according to Modification 1 of the second embodiment.

FIG. 10 is a cross-sectional view showing a structure of a coil CL5 (an example of the coil CL) according to Modification 1 of the second embodiment. In the coil CL5, a molded portion md2 which includes ferrite fg2 is used instead of the molded portion md1. The ferrite fg2 includes iron oxide as a main component, and is a soft magnetic material having high magnetic permeability. The molded portion md2 is made through mixing the granular ferrite fg2 into resin, a magnetic field generated in the electric wire w3 which is wound in an annular shape is concentrated so as to pass through the ferrite fg2 scattered inside the molded portion md2. As a result, the magnetic field hardly leaks to a radial direction outer side of the coil CL5, and the magnetic field is enlarged.

According to the coil CL5 of Modification 1, a magnetic material such as the ferrite fg2 is contained in the molded portion md2 that covers the electric wire w3 which is a bundle having two or more turns, so that the magnetic field generated in the coil CL5 is concentrated inside the molded portion md2, and hardly leaks to the water on the radial direction outer side of the coil CL5. As a result, a Q factor of the coil CL5 is improved, and the reduction in the transmission efficiency is inhibited. Therefore, the coil CL5 can maintain the transmission efficiency and improve waterproof performance.

The magnetic material mixed in the molded portion md2 may be a magnetic material other than the ferrite. For example, silicon steel, permalloy, sendust, or the like may be used besides the ferrite.

Although various embodiments are described above with reference to the drawings, it is needless to say that the present disclosure is not limited to such examples. It will be apparent to those skilled in the art that various changes and modifications can be conceived within the scope of the claims, and it should be understood that such changes and modifications also belong to the technical scope of the present disclosure.

The transmission coil and the electric power transmission apparatus of the above embodiments will be summarized.

A coil CL (an example of the transmission coil) transmits electric power in water. The coil CL includes: an annular electric wire w1 through which an alternating current flows; and a cover member cv1 (an example of a first cover), which includes non-conductive resin or non-magnetic resin and seals a periphery of the electric wire w1. The electric wire w1 transmits the electric power via a magnetic field generated by flowing of the alternating current.

Accordingly in the coil CL, since the cover member cv1, which surrounds the annularly wound electric wire w1, is non-conductive or nonmagnetic, the magnetic field generated by the coil CL can be inhibited from being transmitted to outside of an underwater electric power transmission path. For example, since the cover member cv1 is non-magnetic, in the coil CL, strength of a magnetic field generated due to an alternating current flowing in the coil CL and a magnetic field generated due to resonance with a magnetic field of another coil CL can be inhibited from being absorbed by the cover member cv1. Therefore, by maintaining the strength of the magnetic field, the coil CL can inhibit the reduction in transmission efficiency when the electric power is transmitted via the magnetic field. For example, since the cover member cv1 is non-conductive, in the coil CL, a current flowing through the electric wire can be inhibited from being transmitted to the water, which has high electric conductivity, via the cover member cv1. Therefore, the coil CL can maintain magnitude of the current, maintain the strength of the magnetic field generated on the basis of the current, and inhibit the reduction in the transmission efficiency when the electric power is transmitted via the magnetic field.

Since inside of the coil CL is sealed by the cover member cv1, the coil CL can inhibit water (for example, sea water or fresh water) from entering the electric wire w1 inside the cover member cv1. Since the coil CL is surrounded and sealed by the cover member cv1, direct contact between the coil CL and the water can be inhibited, thus dielectric loss caused by the water can be inhibited. For example, the water can be inhibited from entering space between adjacent electric wires of the wound electric wire w1 (for example, an electric wire of a first turn and an electric wire of a second turn), thus occurrence of the dielectric loss can be inhibited. Therefore, reduction in a Q factor of the coil CL can be inhibited, and reduction in electric power transmission efficiency can be inhibited.

In a case where a voltage applied to the electric wire w1 is a high voltage, the coil CL is more likely to become short-circuited (beak) in the water, which has conductivity, than in the air (space). However the coil CL is hardly short-circuited since a waterproof structure is provided, thus voltage endurance of the coil CL can be improved. Since the coil CL has the waterproof structure, long-term reliability of wire material of the electric wire w1 can be improved. In this way, the coil CL can inhibit the reduction in transmission efficiency during underwater non-contact electric power transmission.

The cover member cv1 may include a notch ct1 along a radial direction of the cover member cv1, and may include a surrounding member hi1 (an example of a second cover) which surrounds a radial direction outer peripheral surface of the electric wire w1 with non-conductive resin or non-magnetic resin, and a non-conductive or non-magnetic self-bonding tape mt1.

Accordingly in the coil CL, a relatively available member, such as the same material as a heat insulating material for an air conditioner pipe, can be used as the surrounding member hi1 surrounding the electric wire w1, thus versatility of the coil CL can be improved. Even in this case, the coil CL can inhibit the water from entering from the notch ct1 by sealing the surrounding member hi1 surrounding the electric wire w1 with the self-bonding tape mt1, thereby securing a waterproof function.

The cover member cv1 may include a molded portion md1 that seals the radial direction outer peripheral surface of the electric wire w1 with non-conductive resin or a non-magnetic resin. The electric wire w1 and the cover member cv1 may be spirally formed along a transmission direction of electric power transmission using the coil CL.

In this way, by surrounding the electric wire w1 with the molded portion md1, the periphery of the electric wire w1 can be sealed without being provided with a notch portion for inserting the electric wire w1. Therefore, the waterproof function of the coil CL can be improved. By spirally winding the electric wire w1, a wide space can be secured inside the coil CL. That is, a wide area can be secured in the coil CL, which enables the electric power to be supplied while inhibiting the reduction in the transmission efficiency.

The cover member cv1 may have flame retardancy.

Accordingly, even when a high voltage is applied to the coil and when heat is generated due to a short circuit or the like, the coil and a periphery thereof are difficult to be combusted. Therefore, safety of the coil CL can be maintained, and a life of the coil CL can be extended.

The cover member cv1 may contain a magnetic material such as ferrite fg1.

Accordingly, the magnetic field generated by the coil CL is concentrated inside the cover member cv1, and is unlikely to leak to outside. Therefore, even if the non-conductive or non-magnetic cover member cv1 or molded portion md1 surrounds the electric wire w1, the magnetic field for electric power transmission can be easily transmitted through the non-conductive or non-magnetic cover member cv1 or molded portion md1. Therefore, the coil CL can secure the waterproof function and improve the electric power transmission efficiency.

An electric power transmission apparatus 100 transmits electric power to an electric power reception apparatus 200 including an electric power reception coil CLB in water. The electric power transmission apparatus 100 includes: one or more coils CL (an example of a transmission coil) including an electric power transmission coil CLA that transmits electric power to the electric power reception coil CLB via a magnetic field a driver 151 (an example of an electric power transmission unit) that transmits AC power to the electric power transmission coil CLA; and a capacitor CA that is connected with the coil CL and forms a resonance circuit 152 that resonates with the coil CL. The coil CL is any one of the coils CL described above.

Accordingly in the electric power transmission apparatus 100, since the cover member cv1, which surrounds the annularly wound electric wire w1, is non-conductive or nonmagnetic, the magnetic field generated by the coil CL can be inhibited from being transmitted to the outside of the underwater electric power transmission path. For example, since the cover member cv1 is non-magnetic, in the coil CL, strength of a magnetic field generated due to an alternating current flowing in the coil CL and a magnetic field generated due to resonance with a magnetic field of another coil CL can be inhibited from being absorbed by the cover member cv1. Therefore, by maintaining the strength of the magnetic field, the coil CL can inhibit the reduction in transmission efficiency when the electric power is transmitted via the magnetic field. For example, since the cover member cv1 is non-conductive, in the coil CL, a current flowing through the electric wire can be inhibited from being transmitted to the water, which has high electric conductivity, via the cover member cv1. Therefore, the coil CL can maintain magnitude of the current, maintain the strength of the magnetic field generated on the basis of the current, and inhibit the reduction in the transmission efficiency when the electric power is transmitted via the magnetic field.

Since the inside of the coil CL is sealed by the cover member cv1, the coil CL can inhibit water (for example, sea water or fresh water) from entering the electric wire w1 inside the cover member cv1. Since the coil CL is surrounded and sealed by the cover member cv1, direct contact between the coil CL and the water can be inhibited, thus dielectric loss caused by the water can be inhibited. For example, the water can be inhibited from entering space between adjacent electric wires of the wound electric wire w1 (for example, an electric wire of a first turn and an electric wire of a second turn), thus occurrence of the dielectric loss can be inhibited. Therefore, the coil CL can inhibit the reduction in the Q factor of the coil CL, and inhibit the reduction in the electric power transmission efficiency.

In a case where a voltage applied to the electric wire w1 is a high voltage, the coil CL is more likely to become short-circuited (beak) in the water, which has conductivity, than in the air (space). However the coil CL is hardly short-circuited since a waterproof structure is provided, thus voltage endurance of the coil CL can be improved. Since the coil CL has the waterproof structure, long-term reliability of wire material of the electric wire w1 can be improved. Through using such a coil CL, the electric power transmission apparatus 100 can inhibit the reduction in the transmission efficiency in the underwater non-contact electric power transmission.

In the above-described embodiments, a processor may be physically configured in any way. Through using a programmable processor, since processing content can be changed by changing programs, a degree of design flexibility of the processor can be improved. The processor may be configured with one semiconductor chip, or may be configured with a plurality of semiconductor chips physically, in a case where the processor is configured with a plurality of semiconductor chips, each control of the above-described embodiments may be realized by another semiconductor chip. In this case, it can be considered that one processor is constituted by the plurality of semiconductor chips. The processor may be configured with the semiconductor chip and a member having a different function (such as a capacitor). One semiconductor chip may be configured to realize a function of the processor and other functions. One processor may be configured with a plurality of processors.

Although the present disclosure is described in detail with reference to specific embodiments, it will be apparent to those skilled in the art that various changes and modifications may be made without departing from the spirit and scope of the disclosure.

The present disclosure is based on Japanese Patent Application No. 2017-069070 filed on Mar. 30, 2017, the contents of which are incorporated herein by reference.

INDUSTRIAL APPLICABILITY

The present disclosure is applicable for a transmission coil and an electric power transmission apparatus which can inhibit reduction in transmission efficiency during underwater non-contact electric power transmission.

REFERENCE SIGNS LIST

10 Electric power transmission system
20 Electric wire
30 Connecting body
40 Weight
45 Buoy
50 Watercraft
60 Underwater vehicle
70 Submarine
80 Water bottom excavator
90 Water surface
95 Water bottom
100 Electric power transmission apparatus
110 Power supply
120 ADC
130 CPU
140 Information communication unit
141 Modulation and demodulation circuit
150 Electric power transmission circuit
151 Driver
152 Resonance circuit
200 Electric power reception apparatus
210 Electric power reception circuit
211 Rectifier circuit
212 Regulator
220 CPU
230 Charge control circuit
240 Secondary battery
250 Information communication unit
251 Modulation and demodulation circuit
300 Transmission efficiency measuring circuit
300T Electric power transmission circuit
300R Electric power reception circuit
310 High-frequency power supply circuit
320 Load apparatus
350 Container
C1, C2, C3, and C4 Capacitor
CL1 CL2, CL3, CL4, CL5 and CL10 Coil
CLA Electric power transmission coil
CLB Electric power reception coil
CLC Booster coil
CA, CB and CC Capacitor
ct1 Notch
fg1 and fg2 Ferrite
hi1 and hi2 Surrounding Member
Lr1 Electric power transmission coil
Lr2 Electric power reception coil
md1 and md2 Molded portion
mt1 Self-bonding tape
st10 Spiral tube
w2, w3 and w10 Electric wire

The invention claimed is:

1. A transmission coil configured to transmit electric power in water, the transmission coil comprising:
an annular electric wire through which an alternating current flows; and
a first cover which includes non-conductive resin or non-magnetic resin and seals a periphery of the electric wire,
wherein the electric wire transmits the electric power via a magnetic field generated by flowing of the alternating current,
wherein the first cover includes:
a second cover which includes a notch formed along a radial direction of the first cover and surrounds an outer peripheral surface of the electric wire in a radial direction with the non-conductive resin or the non-magnetic resin; and
a self-bonding tape configured to seal an outer peripheral surface of the second cover in a radial direction, the self-bonding tape being non-conductive or non-magnetic.

2. The transmission coil according to claim 1, wherein the first cover has flame retardancy.

3. The transmission coil according to claim 1, wherein the first cover includes a magnetic material.

4. An electric power transmission apparatus which transmits electric power to an electric power reception apparatus including an electric power reception coil in water, the electric power transmission apparatus comprising:
one or more transmission coils which include an electric power transmission coil configured to transmit electric power to the electric power reception coil via a magnetic field;
an electric power transmitter configured to transmit AC power to the electric power transmission coil; and
a capacitor which is connected to each of the one or more transmission coils and forms a resonance circuit which resonates with a corresponding transmission coil,
wherein each of the one or more transmission coils is the transmission coil according to claim 1.

5. The electric power transmission apparatus according to claim 4, wherein the one or more transmission coils include one or more booster coils disposed in water between the electric power transmission coil and the electric power reception coil to assist electric power transmission of the electric power transmission coil.

6. The electric power transmission apparatus according to claim 5, wherein each of the one or more booster coils is a non-electric-power-supplied coil.

* * * * *